(12) United States Patent
Otani et al.

(10) Patent No.: US 12,306,640 B2
(45) Date of Patent: May 20, 2025

(54) POSTURE ESTIMATION DEVICE, SENSOR MODULE, MEASUREMENT SYSTEM, MOVING OBJECT, AND POSTURE ESTIMATION METHOD

(71) Applicant: SEIKO EPSON CORPORATION, Tokyo (JP)

(72) Inventors: Fumikazu Otani, Matsumoto (JP); Taketo Chino, Hokuto (JP)

(73) Assignee: SEIKO EPSON CORPORATION (JP)

( * ) Notice: Subject to any disclaimer, the term of this patent is extended or adjusted under 35 U.S.C. 154(b) by 0 days.

(21) Appl. No.: 18/461,598

(22) Filed: Sep. 6, 2023

(65) Prior Publication Data

US 2023/0409052 A1   Dec. 21, 2023

Related U.S. Application Data

(63) Continuation of application No. 17/332,094, filed on May 27, 2021, now Pat. No. 11,797,026.

(30) Foreign Application Priority Data

May 28, 2020 (JP) .................................. 2020-093025
Aug. 26, 2020 (JP) .................................. 2020-142419

(51) Int. Cl.
*G05D 1/00* (2024.01)
*A01B 69/04* (2006.01)
(Continued)

(52) U.S. Cl.
CPC ............. *G05D 1/0891* (2013.01); *G01C 9/02* (2013.01); *A01B 69/008* (2013.01); *B60W 30/02* (2013.01);
(Continued)

(58) Field of Classification Search
CPC ........ G05D 1/0891; G01C 9/02; G01C 21/10; G01C 21/16; A01B 69/008; B60W 30/02;
(Continued)

(56) References Cited

U.S. PATENT DOCUMENTS

2004/0064252 A1   4/2004   Kirkland et al.
2011/0241656 A1   10/2011  Piemonte et al.
(Continued)

FOREIGN PATENT DOCUMENTS

GB         2534417 A    7/2016
JP    H08-021732 A     1/1996
(Continued)

*Primary Examiner* — Aaron L Troost
(74) *Attorney, Agent, or Firm* — Harness, Dickey & Pierce, P.L.C.

(57) ABSTRACT

A posture estimation device estimates a posture of a movable body based on acceleration information based on a posture change of the movable body and angular velocity information based on the posture change of the movable body. The posture estimation device includes a storage unit that stores the acceleration information, the angular velocity information, and a plurality of posture parameters related to a movement of the movable body, a parameter control unit that selects a selection posture parameter from the plurality of posture parameters, and a posture calculation unit that estimates the posture of the movable body by using the acceleration information, the angular velocity information, and the selection posture parameter.

5 Claims, 13 Drawing Sheets

(51) Int. Cl.
*B60W 30/02* (2012.01)
*B60W 40/11* (2012.01)
*B60W 40/112* (2012.01)
*B60W 40/114* (2012.01)
*G01C 9/02* (2006.01)

(52) U.S. Cl.
CPC ............ *B60W 40/11* (2013.01); *B60W 40/112* (2013.01); *B60W 40/114* (2013.01); *B60W 2300/152* (2013.01)

(58) Field of Classification Search
CPC .. B60W 40/11; B60W 40/112; B60W 40/114; B60W 60/008; B60W 2300/152; B60W 2420/905
See application file for complete search history.

(56) References Cited

U.S. PATENT DOCUMENTS

| | | | |
|---|---|---|---|
| 2011/0246117 A1 | 10/2011 | Moore et al. | |
| 2017/0238270 A1* | 8/2017 | Shen | H04W 56/001 370/336 |
| 2018/0017389 A1 | 1/2018 | Sheard et al. | |
| 2018/0372498 A1* | 12/2018 | Nackers | E02F 3/434 |
| 2020/0039522 A1 | 2/2020 | Nakaoka et al. | |

FOREIGN PATENT DOCUMENTS

| | | |
|---|---|---|
| JP | 2013-103319 A | 5/2013 |
| JP | 2014-222238 A | 11/2014 |
| JP | 2015-179002 A | 10/2015 |
| JP | 2017-110998 A | 6/2017 |
| JP | 2020-020631 A | 2/2020 |

\* cited by examiner

POSTURE ESTIMATION DEVICE, SENSOR MODULE, MEASUREMENT SYSTEM, MOVING OBJECT, AND POSTURE ESTIMATION METHOD

This application is a continuation of U.S. patent application Ser. No. 17/332,094 filed May 27, 2021, which is based on, and claims priority from JP Application Serial Number 2020-093025, filed May 28, 2020, and JP Application Serial Number 2020-142419, filed Aug. 26, 2020, the disclosures of which are hereby incorporated by reference herein in their entireties.

BACKGROUND

1. Technical Field

The present disclosure relates to a posture estimation device, a sensor module, a measurement system, a moving object, and a posture estimation method.

2. Related Art

A device or a system of mounting an inertial measurement unit (IMU) on an object and calculating the position or posture of the object with an output signal of the inertial measurement unit is known. A bias error is provided in the output signal of the inertial measurement unit, and an error also occurs in posture calculation. Thus, a technique of correcting such an error with a Kalman filter and estimating the accurate posture of the object is proposed. For example, JP-A-2015-179002 discloses a posture estimation device that calculates a posture change amount of an object by using an output of an angular velocity sensor and estimates the posture of the object by using the posture change amount and a posture parameter.

However, in the posture estimation device disclosed in JP-A-2015-179002, the posture parameter for estimating the posture of the object is fixed. Thus, there is a problem that it is difficult to estimate the posture with high accuracy, with the same posture parameter when the movement of the object is fast or slow.

SUMMARY

A posture estimation device estimates a posture of a movable body based on acceleration information based on a posture change of the movable body and angular velocity information based on the posture change of the movable body. The posture estimation device includes a storage unit that stores the acceleration information, the angular velocity information, and a plurality of posture parameters related to a movement of the movable body, a parameter control unit that selects a selection posture parameter from the plurality of posture parameters, and a posture calculation unit that estimates the posture of the movable body by using the acceleration information, the angular velocity information, and the selection posture parameter.

A sensor module includes the posture estimation device, an inertial measurement unit that includes an acceleration sensor that detects an acceleration, an angular velocity sensor that detects an angular velocity, and a signal processing unit that processes signals output from the acceleration sensor and the angular velocity sensor, and a communication unit that outputs posture information of the movable body estimated by the posture estimation device.

A measurement system includes the sensor module, and a host device that is electrically coupled to the sensor module.

A moving object includes the sensor module and a control device that controls the posture of the movable body based on the posture of the movable body, which is estimated by the sensor module.

A posture estimation method includes mounting a reference sensor module on a movable body, obtaining a reference posture output by operating the movable body, mounting a sensor module and the reference sensor module on the movable body, setting a selection posture parameter used for posture estimation of the sensor module as a first parameter, obtaining a first posture output by operating the movable body, setting a selection posture parameter used for posture estimation of the sensor module as a second parameter, obtaining a second posture output by operating the movable body, and comparing the first posture output and the second posture output to the reference posture output and selecting the selection posture parameter for a posture output close to the reference posture output.

A posture estimation method includes mounting a sensor module to a movable body, setting a selection posture parameter used for posture estimation of the sensor module, as a first parameter, obtaining a first posture output by operating the movable body at a known angle, setting a selection posture parameter used for posture estimation of the sensor module, as a second parameter, obtaining a second posture output by operating the movable body at the known angle, comparing the first posture output and the second posture output with the known angle and selecting the selection posture parameter for a posture output close to the known angle.

DESCRIPTION OF EXEMPLARY EMBODIMENTS

1. First Embodiment

Firstly, a sensor module 1 including a posture estimation device 20 according to a first embodiment will be described with reference to FIGS. 1 and 2.

Figure 1:
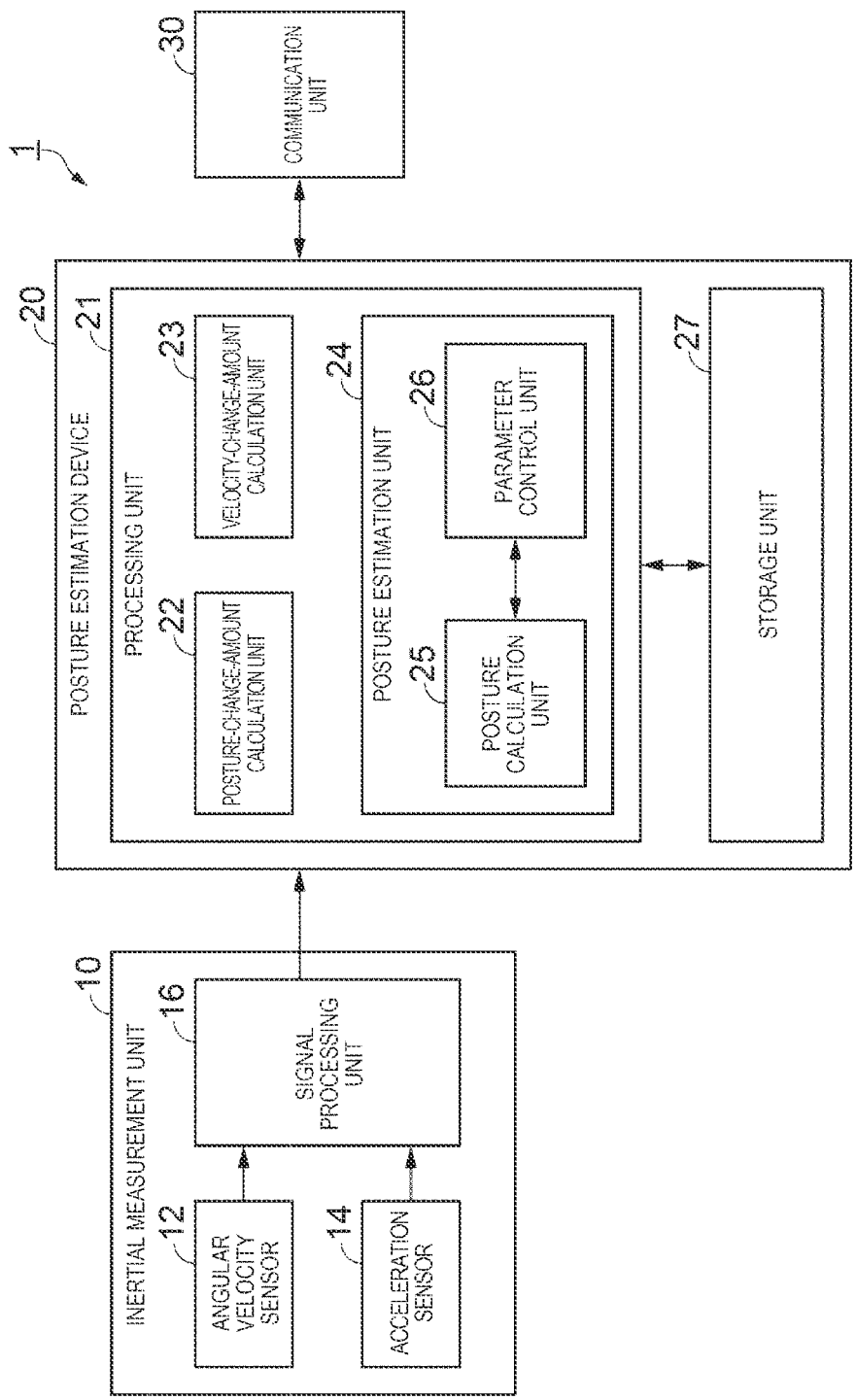
FIG. 1 is a block diagram illustrating a configuration of a sensor module including a posture estimation device according to a first embodiment.

As illustrated in FIG. 1, in the present embodiment, the sensor module 1 includes an inertial measurement unit 10, a posture estimation device 20, and a communication unit 30.

The inertial measurement unit 10 includes an angular velocity sensor 12, an acceleration sensor 14, and a signal processing unit 16.

The angular velocity sensor 12 measures an angular velocity in each of directions of three axes which intersect with each other, in ideal, are perpendicular to each other. The angular velocity sensor 12 outputs an analog signal depending on the magnitude and the orientation of the measured three-axis angular velocity.

The acceleration sensor 14 measures an acceleration in each of directions of three axes which intersect with each other, in ideal, are perpendicular to each other. The acceleration sensor 14 outputs an analog signal depending on the magnitude and the orientation of the measured three-axis acceleration.

The signal processing unit 16 performs processing of performing sampling of an output signal of the angular velocity sensor 12 at a predetermined sampling interval Δt to convert the output signal into angular velocity data having a digital value. The signal processing unit 16 performs processing of performing sampling of an output signal of the acceleration sensor 14 at a predetermined sampling interval Δt to convert the output signal into acceleration data having a digital value.

Ideally, the angular velocity sensor 12 and the acceleration sensor 14 are attached to the inertial measurement unit 10 such that the three axes coincide with three axes (x-axis, y-axis, and z-axis) of the sensor coordinate system which is an orthogonal coordinate system defined for the inertial measurement unit 10. However, in practice, an error occurs in a mounting angle. Thus, the signal processing unit 16 performs processing of converting the angular velocity data and the acceleration data into data in an xyz coordinate system, by using a correction parameter which has been, in advance, calculated in accordance with the error in the mounting angle. The signal processing unit 16 also performs processing of correcting the temperature in the angular velocity data and the acceleration data in accordance with temperature characteristics of the angular velocity sensor 12 and the acceleration sensor 14.

A function of A/D conversion or temperature correction may be embedded in the angular velocity sensor 12 and the acceleration sensor 14.

The inertial measurement unit 10 outputs angular velocity data and acceleration data after the processing by the signal processing unit 16, to the posture estimation device 20.

The posture estimation device 20 includes a processing unit 21 and a storage unit 27. In the posture estimation device 20, the processing unit 21 estimates the posture of a movable body as an object from the storage unit 27 by using acceleration information, angular velocity information, and a selection posture parameter selected from a plurality of posture parameters. The storage unit stores the acceleration information and the angular velocity information based on a posture change of the movable body, which is output from the inertial measurement unit 10, and the plurality of posture parameters related to the movement of the movable body.

The processing unit 21 includes a posture-change-amount calculation unit 22, a velocity-change-amount calculation unit 23, and a posture estimation unit 24. The processing unit 21 performs various types of processing in accordance with a program stored in a ROM of the storage unit 27 or a recording medium or in accordance with a program which is received from a server via a network and then is stored in a RAM of the storage unit 27 or a recording medium. In particular, in the present embodiment, the processing unit 21 executes the program to function as a posture-change-amount calculation unit 22, a velocity-change-amount calculation unit 23, and a posture estimation unit 24. Thus, the inertial measurement unit 10 performs a predetermined calculation on angular velocity data and acceleration data output at a predetermined sampling interval to perform processing of estimating the posture of the movable body. The angular velocity data and the acceleration data output by the inertial measurement unit 10 are stored in the storage unit 27 as angular velocity information and acceleration information.

The posture-change-amount calculation unit 22 calculates the posture change amount of the movable body based on the angular velocity information being an output of the angular velocity sensor 12. Specifically, the posture-change-amount calculation unit 22 performs processing of calculating the posture change amount of the movable body by approximation with a polynomial expression in which the sampling interval is used as a variable. The posture-change-amount calculation unit 22 performs the processing with a three-axis angular velocity in which a bias error was removed by a bias removal unit.

The velocity-change-amount calculation unit 23 calculates the velocity change amount of the movable body based on the acceleration information being the output of the acceleration sensor 14 and the angular velocity information being the output of the angular velocity sensor 12. Specifically, the velocity-change-amount calculation unit 23 performs processing of calculating the velocity change amount of the movable body with the three-axis angular velocity and the three-axis acceleration in which the bias error has been removed by the bias removal unit.

The posture estimation unit 24 includes a posture calculation unit 25 and a parameter control unit 26. The posture estimation unit 24 performs processing of estimating the posture of the movable body by using the posture change amount calculated by the posture-change-amount calculation unit 22, the velocity change amount calculated by the velocity-change-amount calculation unit 23, and the selection posture parameter set by the parameter control unit 26.

The posture calculation unit 25 estimates the posture of the movable body by using the posture change amount and the velocity change amount calculated from the acceleration information and the angular velocity information stored in the storage unit 27, and the selection posture parameter selected from the plurality of posture parameters related to the movement of the movable body by the parameter control unit 26 based on posture parameter selection information stored in the storage unit 27.

The parameter control unit 26 selects the selection posture parameter corresponding to mode setting, from the plurality of posture parameters based on the posture parameter selection information stored in the storage unit 27, in accordance with the mode setting input by a user from an input unit (not illustrated) in the posture estimation device 20. Then, the parameter control unit sets the selected selection posture parameter in the posture calculation unit 25.

Figure 2:
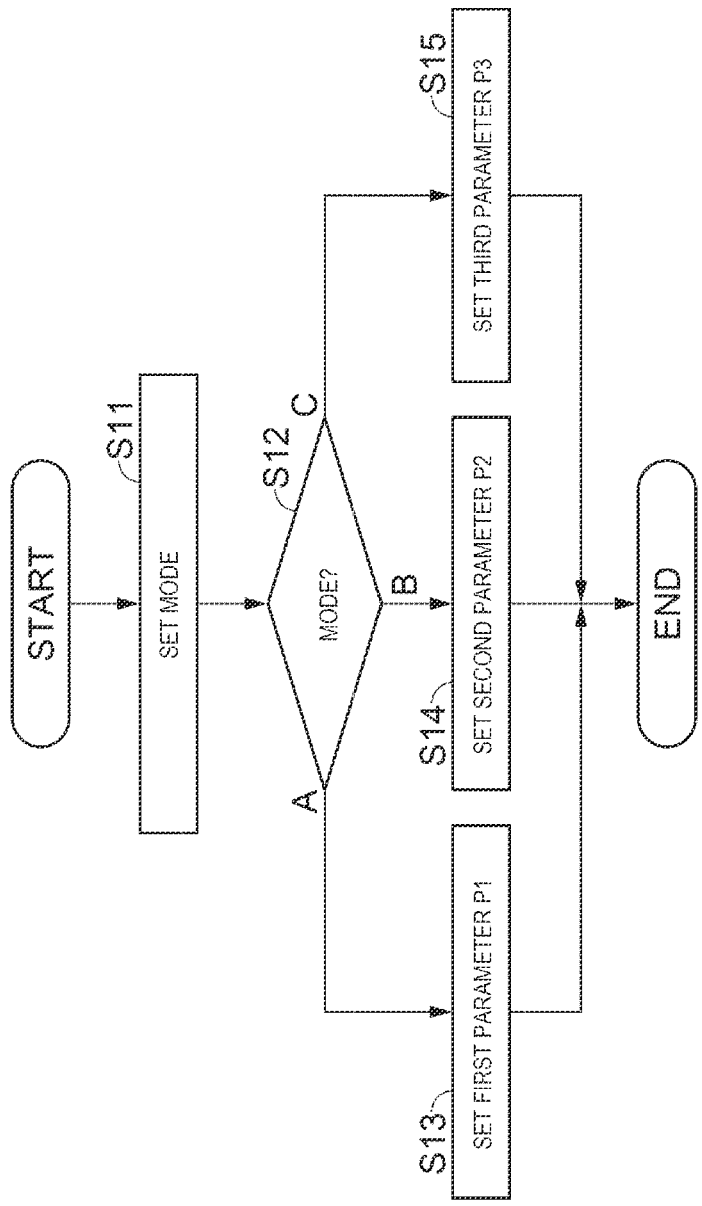
FIG. 2 is a flowchart illustrating a method of setting a posture parameter of a parameter control unit.

Specifically, as illustrated in FIG. 2, when the user sets a mode related to the movement of the movable body in Step S11, in a mode A in Step S12, in Step S13, a first parameter P1 is selected from the storage unit 27 based on the posture parameter selection information, and the first parameter P1 is set in the posture calculation unit 25 as the selection posture parameter. In a mode B, in Step S14, a second parameter P2 is selected from the storage unit 27 based on the posture parameter selection information, and the second parameter P2 is set in the posture calculation unit 25 as the selection posture parameter. In a mode C, in Step S15, a third parameter P3 is selected from the storage unit 27 based on the posture parameter selection information, and the third parameter P3 is set in the posture calculation unit 25 as the selection posture parameter.

In the present embodiment, the movement of the movable body is set as the velocity of the movable body, and the difference in the selection posture parameters is different depending on the difference in the assumed velocity V [km/h] of the movable body.

For example, the first parameter P1 is a parameter when the assumed velocity V is V<x. The second parameter P2 is a parameter when the assumed velocity V is x≤V≤y. The third parameter P3 is a parameter when the assumed velocity V is y<V. Therefore, the posture parameter selection information is obtained by associating the mode divided by the assumed velocity V with the corresponding parameter.

The storage unit 27 includes a ROM that stores programs used when the processing unit 21 performs various types of processing, and various programs or various types of data for realizing application functions, for example.

The storage unit 27 includes a RAM that is used as a work area of the processing unit 21 and temporarily stores a program and data read from the ROM, a result obtained by the processing unit 21 performing an arithmetic operation in accordance with various programs, posture parameter selection information, and a plurality of posture parameters related to the movement of the movable body.

The storage unit 27 includes a non-volatile storage medium that stores data required to be preserved for a long term among pieces of data generated by processing of the processing unit 21. The recording medium may store programs used when the processing unit 21 performs various types of processing, and various programs or various types of data for realizing application functions, for example.

The communication unit 30 is capable of transmitting the posture information of the movable body estimated by the posture estimation device 20 to another device or the like, and receiving a control signal or the like from the other device or the like.

As described above, in the posture estimation device 20 in the present embodiment, the parameter control unit 26 selects the selection posture parameter from the plurality of posture parameters related to the movement of the movable body, based on the posture parameter selection information. Then, the posture calculation unit 25 estimates the posture of the movable body by using the acceleration information, the angular velocity information, and the selection posture parameter. Thus, it is possible to estimate the posture of the movable body in accordance with the movement of the movable body with high accuracy.

In the present embodiment, the sensor module 1 includes the posture estimation device 20 described above. Thus, it is possible to estimate the posture of the movable body in accordance with the movement of the movable body with high accuracy and to transmit the estimated posture to another device.

Next, a posture estimation method using the sensor module 1 including the posture estimation device 20 according to the present embodiment will be described with reference to FIG. 3.

Figure 3:
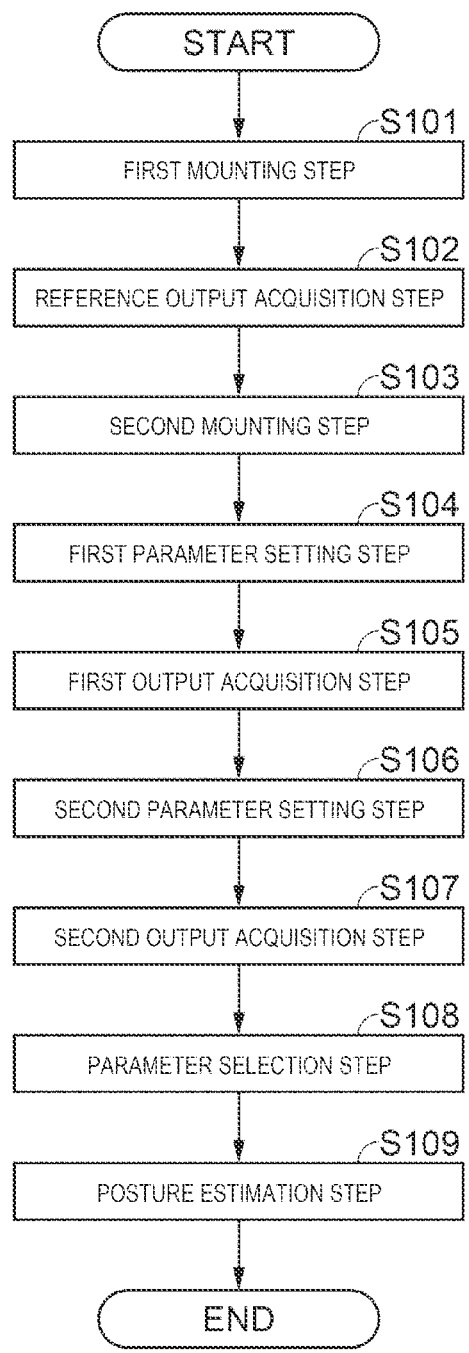
FIG. 3 is a flowchart illustrating a posture estimation method of the sensor module.

As illustrated in FIG. 3, the posture estimation method according to the present embodiment includes a first mounting step, a reference output acquisition step, a second mounting step, a first parameter setting step, a first output acquisition step, a second parameter setting step, a second output acquisition step, a parameter selection step, and a posture estimation step.

1.1 First Mounting Step

Firstly, in Step S101, a reference sensor module having a high-accurate posture measurement function that is not influenced by the velocity of the movement of a movable body is mounted on the movable body as a target.

1.2 Reference Output Acquisition Step

Then, in Step S102, the movable body is operated to obtain a reference posture output.

1.3 Second Mounting Step

Then, in Step S103, the sensor module 1 is mounted on the movable body on which the reference sensor module is mounted.

1.4 First Parameter Setting Step

Then, in Step S104, the first parameter P1 is set as the selection posture parameter used for posture estimation of the sensor module 1.

1.5 First Output Acquisition Step

Then, in Step S105, the movable body is operated to obtain a first posture output calculated by the first parameter P1.

1.6 Second Parameter Setting Step

Then, in Step S106, a second parameter P2 is set as the selection posture parameter used for posture estimation of the sensor module 1.

1.7 Second Output Acquisition Step

Then, in Step S107, the movable body is operated to obtain a second posture output calculated by the second parameter P2.

1.8 Parameter Selection Step

Then, in Step S108, the first posture output and the second posture output are compared to the reference posture output, and a selection posture parameter for a posture output close to the reference posture output is selected.

1.9 Posture Estimation Step

Then, in Step S109, a selection posture parameter for a posture output close to the reference posture output is set. Processing of estimating the posture of the movable body is performed, and the posture of the movable body is estimated.

The selection posture parameter for a posture output close to the reference posture output as a reference is selected, and the posture of the movable body is estimated using the selected selection posture parameter. Thus, it is possible to estimate the posture of the movable body with higher accuracy. In the present embodiment, the selection posture parameter for the posture output close to the reference posture output is selected using two selection posture parameters. The number of selection posture parameters used for comparison may be any value that is equal to or more than 2. As the number of selection posture parameters used for comparison increases, it is possible to select the selection posture parameter for the posture output closer to the reference posture output.

As described above, in the posture estimation method in the present embodiment, since the selection posture parameter for the posture output close to the reference posture output as a reference is actually measured and then selected, it is possible to estimate the posture of the movable body with higher accuracy.

In the posture estimation method in the present embodiment, the velocity of the movable body is used as the movement of the movable body, but the movement is not limited to this. Any of the acceleration, the angular velocity, the angular acceleration, and the length of a stop time of the movable body can be used. With such elements, it is possible to obtain a posture estimation method of estimating the posture of the movable body with higher accuracy.

2. Second Embodiment

Next, a sensor module 1a including a posture estimation device 20a according to a second embodiment will be described with reference to FIGS. 4 and 5.

The posture estimation device 20a in the present embodiment is similar to the posture estimation device 20 in the first embodiment except that the configuration of a posture estimation unit 24a is different from that of the posture estimation device 20 in the first embodiment. The differences from the first embodiment described above will be mainly described, and the description of the similar matters will be omitted.

Figure 4:
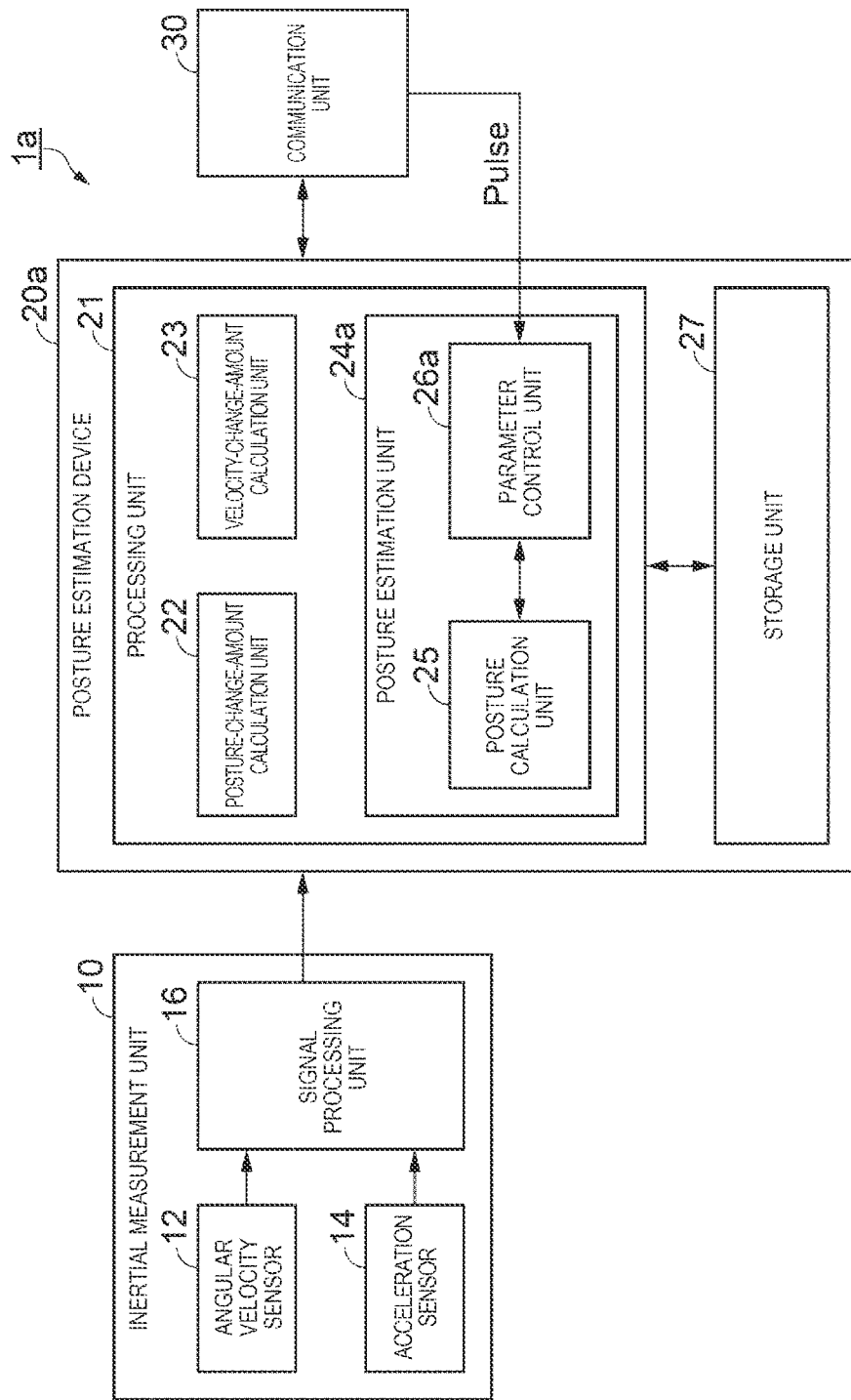
FIG. 4 is a block diagram illustrating a configuration of a sensor module including a posture estimation device according to a second embodiment.

As illustrated in FIG. 4, the posture estimation unit 24a in the posture estimation device 20a includes a posture calculation unit 25 and a parameter control unit 26a. The posture estimation unit selects a selection posture parameter from a plurality of posture parameters based on a Pulse signal being movement information of the movable body from the communication unit 30, and performs processing of estimating the posture of the movable body. The Pulse signal is, for example, a vehicle velocity pulse signal obtained by measuring the velocity of a vehicle as the movable body or a pulse-per-second (PPS) signal output from a GPS attached to the movable body.

The parameter control unit 26a selects the selection posture parameter corresponding to the Pulse signal, from a plurality of posture parameters stored in the storage unit 27 based on the Pulse signal which is the movement information of the movable body from the communication unit 30. Then, the parameter control unit sets the selection posture parameter in the posture calculation unit 25.

Figure 5:
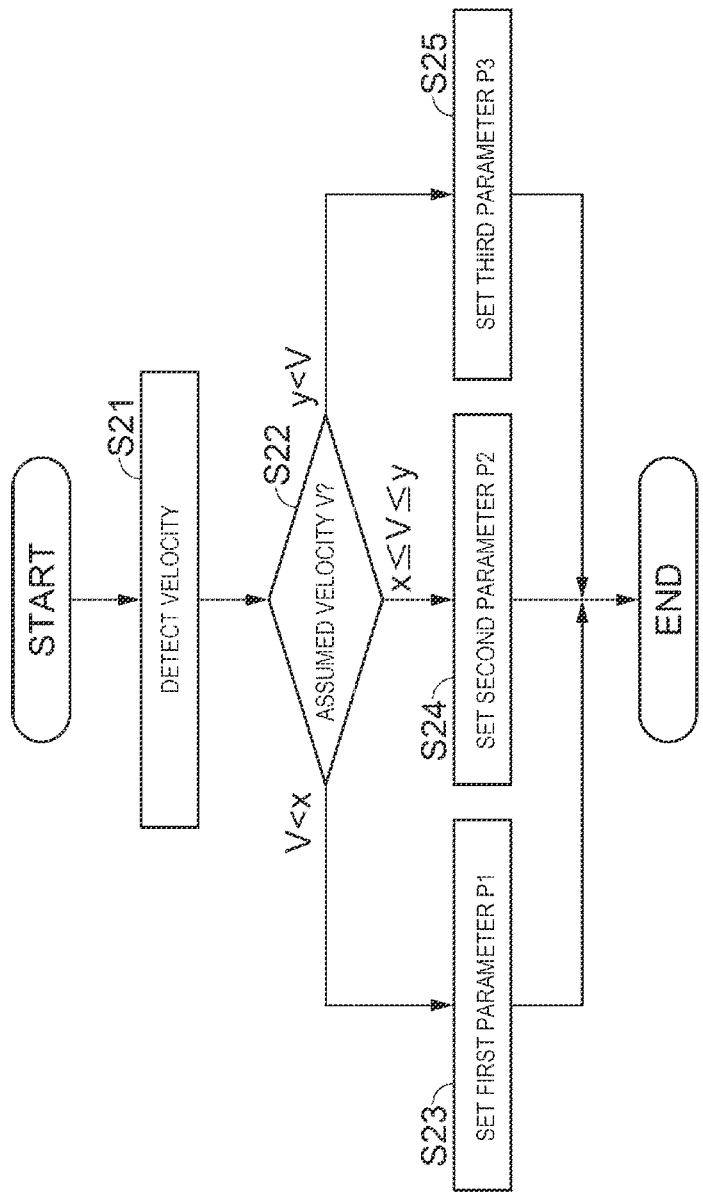
FIG. 5 is a flowchart illustrating a method of setting a posture parameter of a parameter control unit.

Specifically, as illustrated in FIG. 5, in Step S21, the velocity is detected from the Pulse signal from the communication unit 30. In Step S22, when the assumed velocity V is V<x, in Step S23, a first parameter P1 is selected from the storage unit 27 and set in the posture calculation unit 25. When the assumed velocity V is x≤V≤y, in Step S24, a second parameter P2 is selected from the storage unit 27 and set in the posture calculation unit 25. When the assumed velocity V is y<V, in Step S25, a third parameter P3 is selected from the storage unit 27 and set in the posture calculation unit 25.

The posture calculation unit 25 calculates the posture of the movable body by using the selection posture parameter selected by the parameter control unit 26a based on the Pulse signal.

With such a configuration, the posture estimation device 20a in the present embodiment can automatically select the optimum selection posture parameter in accordance with the movement of the movable body from the Pulse signal which is the movement information of the movable body. Thus, it is possible to estimate the posture of the movable body with higher accuracy.

3. Third Embodiment

Next, a sensor module 1b including a posture estimation device 20b according to a third embodiment will be described with reference to FIGS. 6 and 7.

The posture estimation device 20b in the present embodiment is similar to the posture estimation device 20 in the first embodiment except that the configuration of a posture estimation unit 24b is different from that of the posture estimation device 20 in the first embodiment. The differences from the first embodiment described above will be mainly described, and the description of the similar matters will be omitted.

Figure 6:
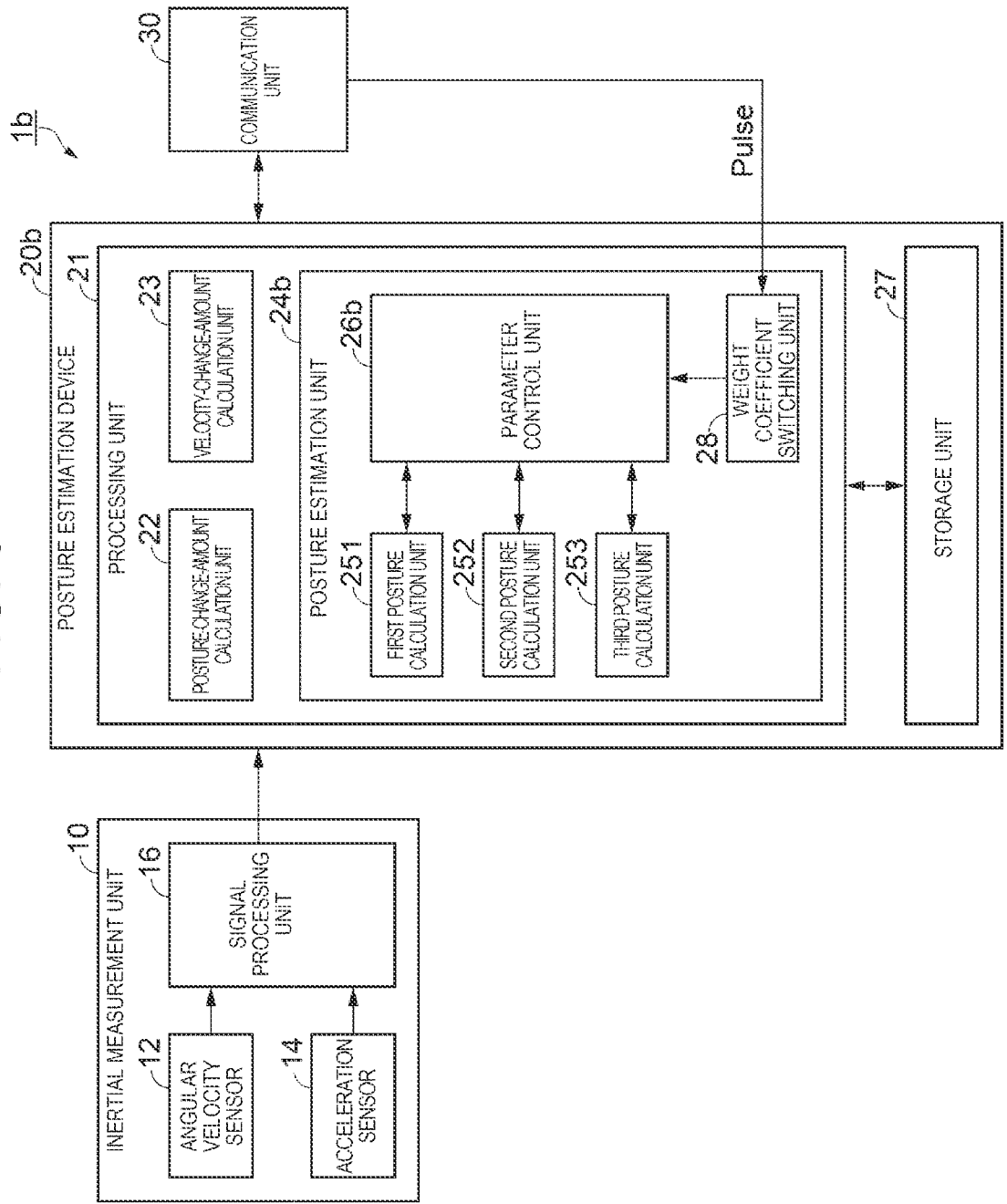
FIG. 6 is a block diagram illustrating a configuration of a sensor module including a posture estimation device according to a third embodiment.

As illustrated in FIG. 6, the posture estimation unit 24b in the posture estimation device 20b includes a first posture calculation unit 251, a second posture calculation unit 252, a third posture calculation unit 253, a parameter control unit 26b, and a weight coefficient switching unit 28. The posture estimation unit 24b performs processing of estimating the posture of a movable body in a manner as follows. The posture estimation unit selects at least two posture parameters as the selection posture parameters based on the Pulse signal which is the movement information of the movable body from the communication unit 30, multiplies the selected posture parameters by weight coefficients R, respectively, to calculate the posture of the movable body, and adds the calculated results. In the present embodiment, a case where three posture parameters are selected will be described as an example.

The first posture calculation unit 251 calculates the posture of the movable body by using the posture parameter obtained by multiplying the first parameter P1 selected by the parameter control unit 26b by the weight coefficient R set by the weight coefficient switching unit 28.

The second posture calculation unit 252 calculates the posture of the movable body using the posture parameter obtained by multiplying the second parameter P2 selected by the parameter control unit 26b by the weight coefficient R set by the weight coefficient switching unit 28.

The third posture calculation unit 253 calculates the posture of the movable body using the posture parameter obtained by multiplying the third parameter P3 selected by the parameter control unit 26b by the weight coefficient R set by the weight coefficient switching unit 28.

The parameter control unit 26b multiplies the first parameter P1 selected from the plurality of posture parameters stored in the storage unit 27 by the weight coefficient R which is set by the weight coefficient switching unit 28 and corresponds to the first parameter P1, and sets the resultant in the first posture calculation unit 251.

The parameter control unit 26b multiplies the second parameter P2 selected from the plurality of posture parameters stored in the storage unit 27 by the weight coefficient R which is set by the weight coefficient switching unit 28 and corresponds to the second parameter P2, and sets the resultant in the second posture calculation unit 252.

The parameter control unit 26b multiplies the third parameter P3 selected from the plurality of posture parameters stored in the storage unit 27 by the weight coefficient R which is set by the weight coefficient switching unit 28 and corresponds to the third parameter P3, and sets the resultant in the third posture calculation unit 253.

The weight coefficient switching unit 28 switches the weight coefficient between the weight coefficient R for the first parameter P1, the weight coefficient R for the second parameter P2, and the weight coefficient R for the third parameter P3, based on the Pulse signal which is the movement information of the movable body from the communication unit 30.

Figure 7:
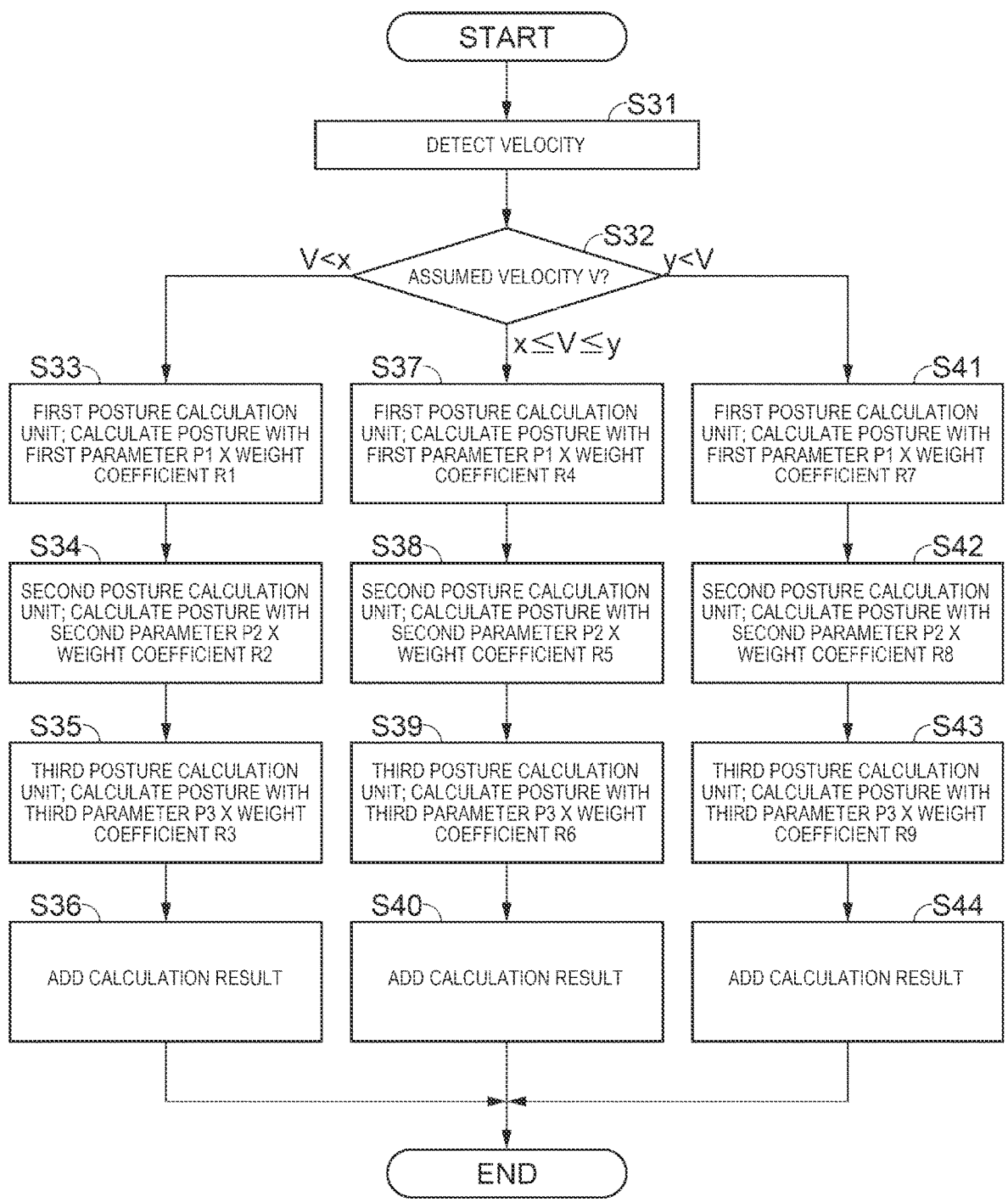
FIG. 7 is a flowchart illustrating a method of estimating a posture of a movable body by the posture estimation device.

As illustrated in FIG. 7, in the processing of estimating the posture of the movable body in the posture estimation device 20b, firstly, in Step S31, the velocity is detected from the Pulse signal from the communication unit 30. Then, in Step S32, the conditions are divided in accordance with the assumed velocity V.

When the assumed velocity V is V<x, the first posture calculation unit 251 calculates the posture of the movable body by using the first parameter P1 multiplied by a weight coefficient R1 (for example, 0.6) set by the weight coefficient switching unit 28 in Step S33. In Step S34, the second posture calculation unit 252 calculates the posture of the movable body by using the second parameter P2 multiplied by a weight coefficient R2 (for example, 0.3) set by the weight coefficient switching unit 28. In Step S35, the third posture calculation unit 253 calculates the posture of the movable body by using the third parameter P3 multiplied by a weight coefficient R3 (for example, 0.1) set by the weight coefficient switching unit 28. Then, in Step S36, the calculation result of the first posture calculation unit 251, the calculation result of the second posture calculation unit 252, and the calculation result of the third posture calculation unit 253 are added to obtain the posture of the movable body.

When the assumed velocity V is x≤V≤y, the first posture calculation unit 251 calculates the posture of the movable body by using the first parameter P1 multiplied by a weight coefficient R4 (for example, 0.2) set by the weight coefficient switching unit 28 in Step S37. In Step S38, the second posture calculation unit 252 calculates the posture of the movable body by using the second parameter P2 multiplied by a weight coefficient R5 (for example, 0.6) set by the weight coefficient switching unit 28. In Step S39, the third posture calculation unit 253 calculates the posture of the movable body by using the third parameter P3 multiplied by a weight coefficient R6 (for example, 0.2) set by the weight coefficient switching unit 28. Then, in Step S40, the calculation result of the first posture calculation unit 251, the calculation result of the second posture calculation unit 252, and the calculation result of the third posture calculation unit 253 are added to obtain the posture of the movable body.

When the assumed velocity V is y<V, the first posture calculation unit 251 calculates the posture of the movable body by using the first parameter P1 multiplied by a weight coefficient R7 (for example, 0.1) set by the weight coefficient switching unit 28 in Step S41. In Step S42, the second posture calculation unit 252 calculates the posture of the movable body by using the second parameter P2 multiplied by a weight coefficient R8 (for example, 0.3) set by the weight coefficient switching unit 28. In Step S43, the third posture calculation unit 253 calculates the posture of the movable body by using the third parameter P3 multiplied by a weight coefficient R9 (for example, 0.6) set by the weight coefficient switching unit 28. Then, in Step S44, the calculation result of the first posture calculation unit 251, the calculation result of the second posture calculation unit 252, and the calculation result of the third posture calculation unit 253 are added to obtain the posture of the movable body.

With such a configuration, the posture estimation device 20b in the present embodiment can dynamically switch the weight coefficient R of the selection posture parameter in accordance with the movement of the movable body from the Pulse signal which is the movement information of the movable body. Thus, it is possible to estimate the posture of the movable body with higher accuracy.

4. Fourth Embodiment

Next, a posture estimation method of sensor modules 1, 1a, 1b according to a fourth embodiment will be described with reference to FIG. 8. In the following description, the sensor module 1 will be applied.

Figure 8:
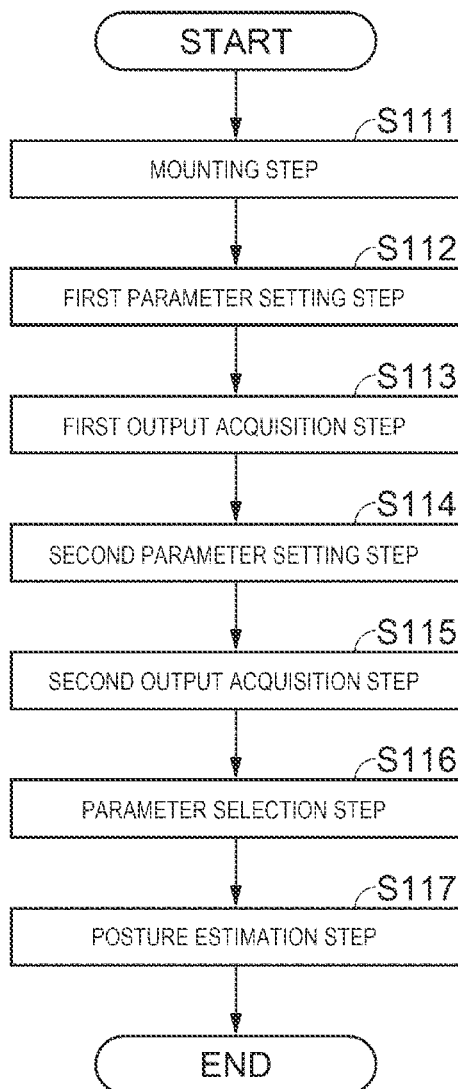
FIG. 8 is a flowchart illustrating a posture estimation method of a sensor module according to a fourth embodiment.

As illustrated in FIG. 8, the posture estimation method according to the present embodiment includes a mounting step, a first parameter setting step, a first output acquisition step, a second parameter setting step, a second output acquisition step, a parameter selection step, and a posture estimation step.

4.1 Mounting Step

Firstly, in Step S111, the sensor module 1 is mounted on a movable body as a target.

4.2 First Parameter Setting Step

Then, in Step S112, a first parameter P1 is set as the selection posture parameter used for posture estimation of the sensor module 1.

4.3 First Output Acquisition Step

In Step S113, the movable body is operated at a known angle to obtain a first posture output calculated by the first parameter P1.

4.4 Second Parameter Setting Step

In Step S114, a second parameter P2 is set as the selection posture parameter used for posture estimation of the sensor module 1.

4.5 Second Output Acquisition Step

In Step S115, the movable body is operated at the known angle to obtain a second posture output calculated by the second parameter P2.

4.6 Parameter Selection Step

Then, in Step S116, the first posture output and the second posture output are compared with the known angle, and a selection posture parameter for a posture output close to the known angle is selected.

4.7 Posture Estimation Step

In Step S117, a selection posture parameter for a posture output close to the known angle is set. Processing of estimating the posture of the movable body is performed, and the posture of the movable body is estimated.

The selection posture parameter for a posture output close to the known angle is selected, and the posture of the movable body is estimated using the selected selection posture parameter. Thus, it is possible to estimate the posture of the movable body with higher accuracy. In the present embodiment, the selection posture parameter for the posture output close to the known angle is selected using two selection posture parameters. The number of selection posture parameters used for comparison may be any value that is equal to or more than 2. As the number of selection posture parameters used for comparison increases, it is possible to select the selection posture parameter for the posture output closer to the known angle.

As described above, in the posture estimation method in the present embodiment, since the selection posture parameter for the posture output close to the known angle is actually measured and then selected, it is possible to estimate the posture of the movable body with higher accuracy.

5. Fifth Embodiment

Figure 9:
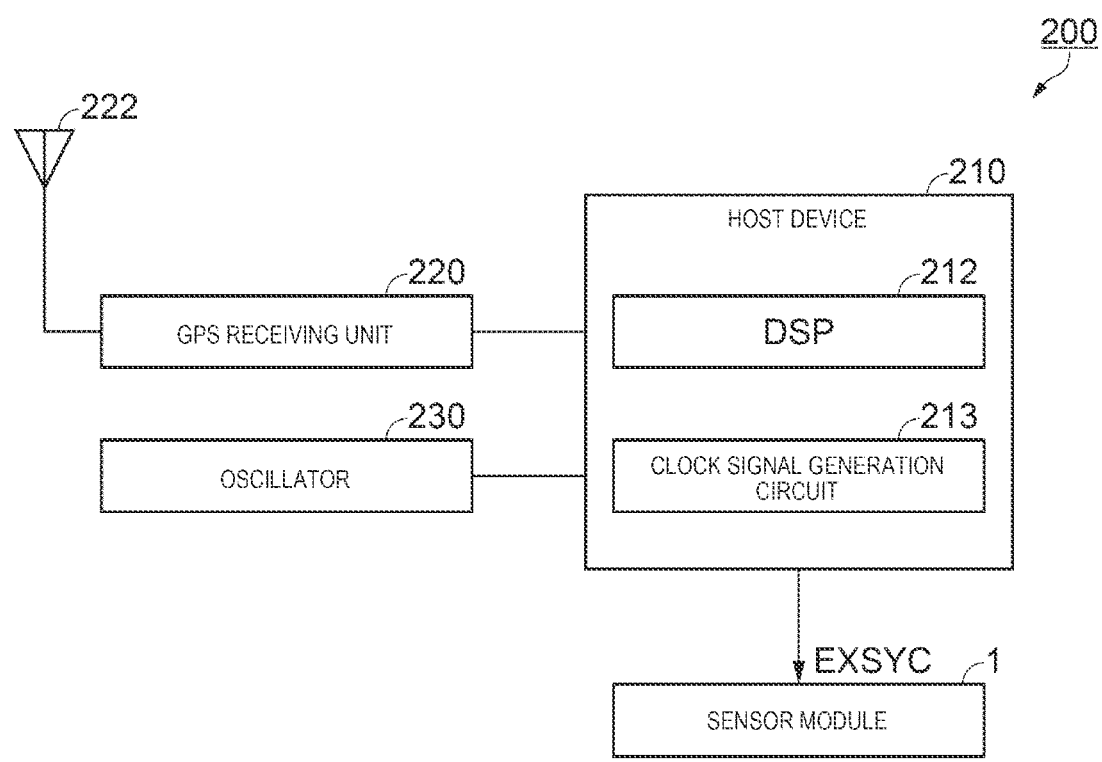
FIG. 9 is a block diagram illustrating a configuration of a measurement system including a sensor module according to a fifth embodiment.

Next, a measurement system 200 including sensor modules 1, 1a, 1b according to a fifth embodiment will be described with reference to FIG. 9. In the following description, a configuration to which the sensor module 1 is applied will be illustrated and described.

The measurement system 200 according to the present embodiment includes a sensor module 1 and a host device 210 that is electrically coupled to the sensor module 1. The measurement system may further include a GPS receiving unit 220, a GPS receiving antenna 222, and an oscillator 230. The host device 210 may be realized by various processors such as an MPU. The host device 210 may be realized by an integrated circuit device of an ASIC. The host device 210 includes a DSP 212 that performs digital signal processing and a clock signal generation circuit 213 that generates a clock signal.

The GPS receiving unit 220 receives a signal from a GPS satellite via the antenna 222. That is, a satellite signal on which position information is superimposed is received as a GPS carrier wave. The GPS receiving unit 220 is a GPS receiver and may be realized by an integrated circuit device including a GPS receiving circuit. The host device 210 detects GPS positioning data representing the position, the velocity, and the direction of an object to be measured such as a moving object, based on the signal received by the GPS receiving unit 220. The position of the object to be measured is latitude, longitude, altitude, or the like. The GPS positioning data also includes status data indicating a reception status, reception time, and the like. The host device 210 receives acceleration data and angular velocity data from the sensor module 1, performs inertial navigation calculation processing on the received data, and obtains inertial navigation positioning data. The inertial navigation positioning data includes acceleration data and posture data of the object to be measured. The host device 210 calculates the position of the object to be measured and the like based on the obtained inertial navigation positioning data and GPS positioning data. When the object to be measured is a moving object such as an automobile, the position on the ground where the moving object is running is calculated. Processing of calculating the position and the posture of an object to be measured in such a manner can be realized by Kalman filter processing using the DSP 212.

The oscillator 230 generates an oscillation clock signal using an oscillator such as a quartz crystal oscillator. The oscillator 230 is, for example, a temperature compensated oscillator (TCXO). Alternatively, an oven-controlled crystal oscillator (OCXO) including an oven and the like may be used as the oscillator 230. The clock signal generation circuit 213 generates various clock signals used in the host device 210 based on an oscillation clock signal from the oscillator 230. In this case, the clock signal generation circuit 213 generates a clock signal based on a time reference signal which is a signal acquired from a satellite positioning system such as GPS. For example, an external synchronization signal EXSYC is generated as one of the clock signals.

The host device 210 can acquire accurate absolute time information based on time information included in the satellite signal received by the GPS receiving unit 220. The time information is information such as year, month, day, hour, minute, and second. The GPS receiving unit 220 outputs a PPS signal in which a pulse is generated every second, as a time reference signal. The clock signal generation circuit 213 includes a PLL circuit that operates by the oscillation clock signal from the oscillator 230. The PPS signal is input to the PLL circuit as a clock synchronization reference signal. The PLL circuit generates a clock signal synchronized with the PPS signal as a time reference signal. The host device 210 outputs the external synchronization signal EXSYC synchronized with the time reference signal to the sensor module 1 in this manner.

As described above, in the present embodiment, the external synchronization signal EXSYC is a signal generated based on the time reference signal. Thus, it is possible to acquire detection data of the angular velocity sensor 12 and the acceleration sensor 14 by using the external synchronization signal EXSYC generated based on the time reference signal. That is, by using the external synchronization signal EXSYC generated based on the time reference signal, it is possible to acquire the detection data from the detection circuits of the angular velocity sensor 12 and the acceleration sensor 14 at a timing synchronized with the accurate time. Thus, it is possible to output the detection data acquired at an appropriate timing synchronized with the accurate time, to the signal processing unit 16, and thus to improve the accuracy of information measured using the sensor module 1.

For example, the host device 210 can acquire accurate absolute time information by using the satellite signal received by the GPS receiving unit 220. Thus, it is also possible to specify the absolute time of each synchronization timing of the external synchronization signal EXSYC. The detection data acquired at the synchronization timing of the external synchronization signal EXSYC is output from the sensor module 1. A delay time from an acquisition timing of the detection data by the angular velocity sensor 12 and the acceleration sensor 14 to a timing at which the detection data is input to the host device 210 is a delay time by digital processing. Thus, the host device 210 can specify the number of clocks, which is the length of the delay time. Thus, the host device 210 can specify a time at which the detection data such as the acceleration data and the angular velocity data input from the sensor module 1 is acquired. As described above, the host device 210 calculates the position and the like of the object to be measured, based on the GPS positioning data obtained based on the satellite signal and the inertial navigation positioning data obtained based on the detection data from the sensor module 1. Therefore, it is possible to specify the absolute time of the acquisition timing of the detection data such as the acceleration data and the angular velocity data, and thus to accurately calculate the position and the like of the object to be measured.

In the present embodiment, the time reference signal is, for example, a signal acquired from a satellite positioning system. For example, the time reference signal is a PPS signal acquired from the satellite positioning system. In this manner, it is possible to acquire the time reference signal by effectively utilizing the satellite positioning system, and to acquire the detection data by the angular velocity sensor 12 and the acceleration sensor 14 by using the external synchronization signal EXSYC generated based on the acquired time reference signal.

6. Sixth Embodiment

Next, a moving object 500 including sensor modules 1, 1a, 1b according to a sixth embodiment will be described with reference to FIGS. 10 and 11. In the following description, a configuration to which the sensor module 1 is applied will be illustrated and described.

The moving object 500 according to the present embodiment includes the sensor module 1 in the above embodiment, and a control device 570 that controls the posture of the moving object 500 based on posture information of the moving object 500 estimated by the posture estimation device 20 of the sensor module 1.

Figure 10:
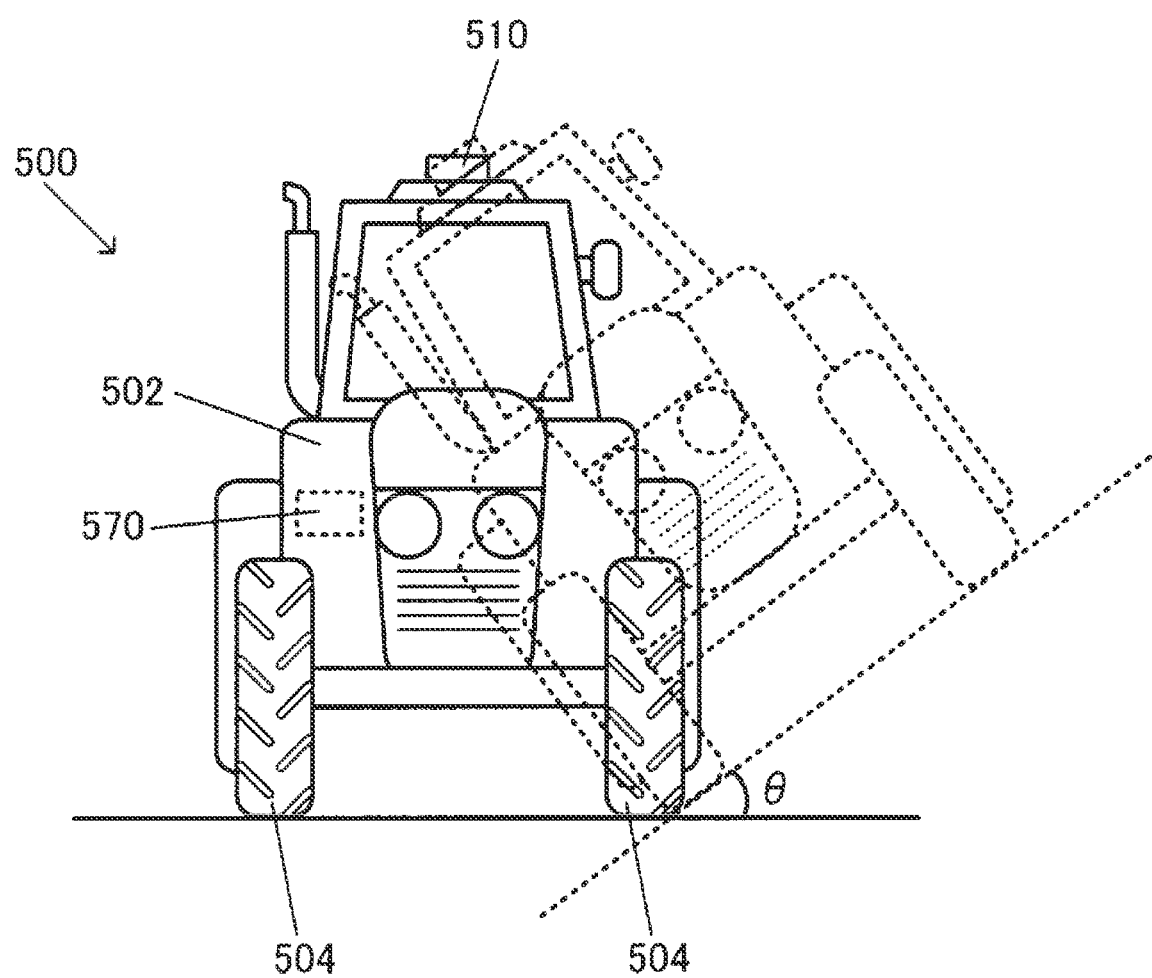
FIG. 10 is a diagram illustrating a configuration of a moving object including a sensor module according to a sixth embodiment.

As illustrated in FIG. 10, the moving object 500 includes a vehicle body 502 and wheels 504. A positioning device 510 is mounted on the moving object 500. The control device 570 that performs vehicle control and the like is provided in the moving object 500. As illustrated in FIG. 11, the moving object 500 includes a driving mechanism 580 such as an engine and a motor, a braking mechanism 582 such as a disk brake and a drum brake, and a steering mechanism 584 realized by a steering wheel and a steering gear box. As described above, the moving object 500 is equipment or a device that includes the driving mechanism 580, the braking mechanism 582, and the steering mechanism 584 and moves on the ground, in the sky, or in the sea. For example, the moving object 500 is a four-wheel vehicle such as an agricultural machine.

The positioning device 510 is a device that is mounted on the moving object 500 and performs positioning of the moving object 500. The positioning device 510 includes the sensor module 1 including the inertial measurement unit 10 and the posture estimation device 20, a GPS receiving unit 520, and a GPS receiving antenna 522. The posture estimation device 20 includes a position information acquisition unit, a position composition unit, a calculation processing unit, and a positioning processing unit. The inertial measurement unit 10 includes a three-axis acceleration sensor 14 and a three-axis angular velocity sensor 12. The calculation processing unit receives acceleration data and angular velocity data from the acceleration sensor 14 and the angular velocity sensor 12, performs inertial navigation calculation processing on the received data, and outputs inertial navigation positioning data. The inertial navigation positioning data indicates the acceleration or the posture of the moving object 500.

The GPS receiving unit 520 receives a signal from a GPS satellite via the antenna 522. The position information acquisition unit outputs GPS positioning data based on the signal received by the GPS receiving unit 520. The GPS positioning data indicates the position, the velocity, and the direction of the moving object 500 on which the positioning device 510 is mounted. The position composition unit calculates a position at which the moving object 500 runs on the ground at the current time, based on the inertial navigation positioning data output from the calculation processing unit and the GPS positioning data output from the position information acquisition unit. For example, when the posture of the moving object 500 differs by an influence of an inclination (0) of the ground and the like as illustrated in FIG. 10 even though the position of the moving object 500, which is included in the GPS positioning data is the same, the moving object 500 runs at a different position on the ground. Therefore, it is not possible to calculate the accurate position of the moving object 500 only with the GPS positioning data.

Thus, the position composition unit calculates a position at which the moving object 500 runs on the ground at the current time, by using data regarding the posture of the moving object 500 among types of inertial navigation positioning data. Position data output from the position composition unit is subjected to predetermined processing by the positioning processing unit, and is displayed in the display unit 550, as a positioning result. The position data may be transmitted to an external device by the communication unit 30.

The control device 570 controls the driving mechanism 580, the braking mechanism 582, and the steering mechanism 584 of the moving object 500. The control device 570 is a controller of controlling the vehicle. For example, the control device 570 can be realized by a plurality of control units. The control device 570 includes a vehicle control unit 572 being a control unit that controls the vehicle, an automatic driving control unit 574 being a control unit that controls automatic driving, and a storage unit 576 realized by a semiconductor memory and the like. A monitoring device 578 monitors an object such as an obstacle around the moving object 500. The monitoring device 578 is realized by a surrounding monitoring camera, a millimeter wave radar, a sonar or the like.

Figure 11:
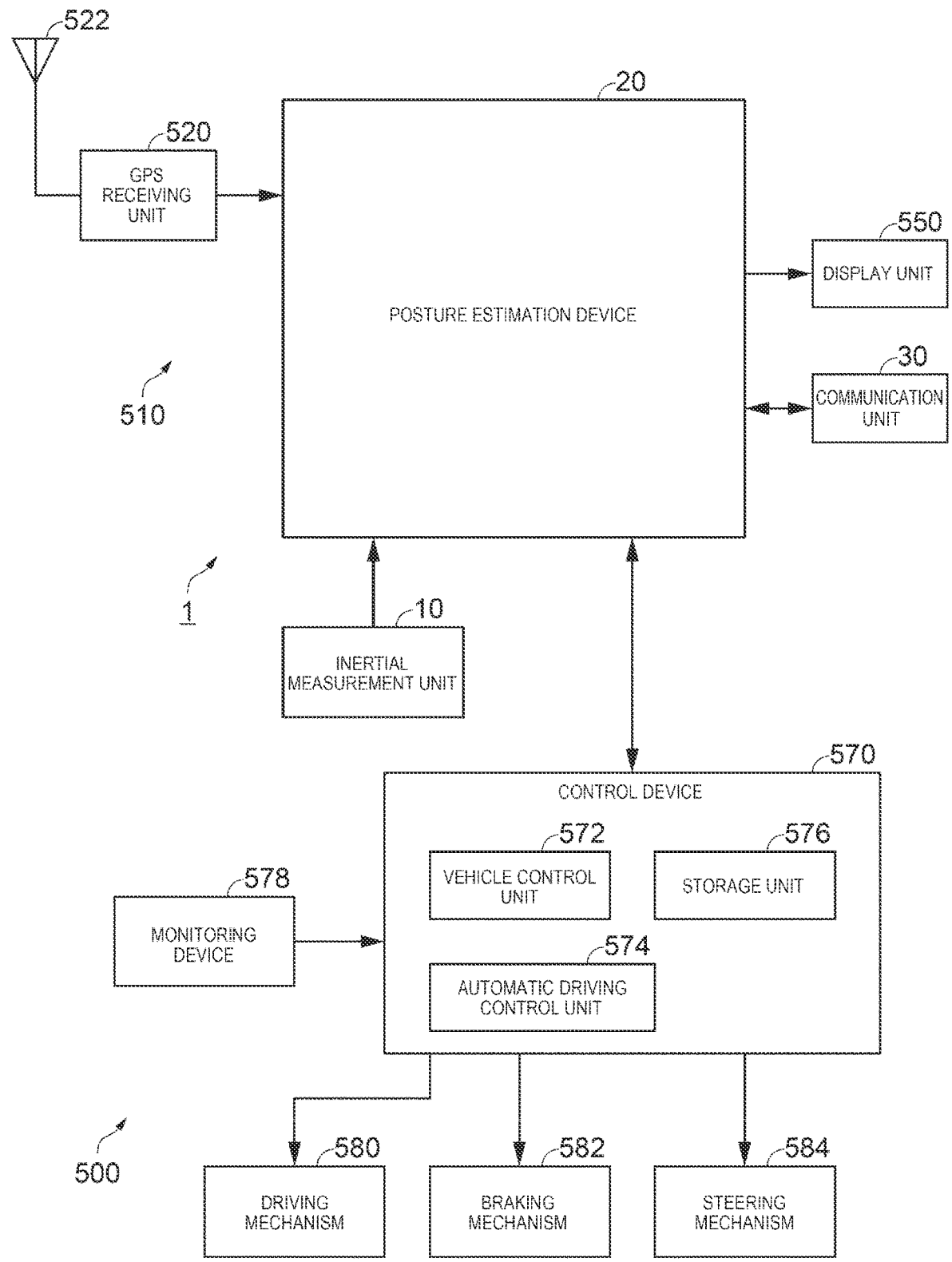
FIG. 11 is a block diagram illustrating a configuration of the moving object.

As illustrated in FIG. 11, the moving object 500 in the embodiment includes the posture estimation device 20 and the control device 570. The control device 570 controls the posture of the moving object 500 based on the posture information of the moving object 500, which has been estimated by the posture estimation device 20. For example, the posture estimation device 20 performs various types of processing as described above, based on an output signal including detection data from the inertial measurement unit 10, so as to obtain information of the position or the posture of the moving object 500. For example, the posture estimation device 20 can obtain information of the position of the moving object 500 based on the GPS positioning data and the inertial navigation positioning data as described above. The posture estimation device 20 can estimate information of the posture of the moving object 500 based on angular velocity data and the like included in the inertial navigation positioning data, for example. The information of the posture of the moving object 500 can be represented by quaternion or by a roll angle, a pitch angle, and a yaw angle, for example. The control device 570 controls the posture of the moving object 500 based on the posture information of the moving object 500, which has been estimated by the processing of the posture estimation device 20. The control is performed by the vehicle control unit 572, for example. The control of the posture can be realized by the control device 570 controlling the steering mechanism 584, for example. Alternatively, in control (such as slip control) for stabilizing the posture of the moving object 500, the control device 570 may control the driving mechanism 580 or control the braking mechanism 582. According to the embodiment, with the posture estimation device 20, it is possible to estimate information of a posture with high accuracy. Accordingly, it is possible to realize appropriate posture control of the moving object 500.

In the embodiment, the control device 570 controls at least one of accelerating, braking, and steering of the moving object 500 based on information of the position and the posture of the moving object 500, which has been obtained by the posture estimation device 20. For example, the control device 570 controls at least one of the driving mechanism 580, the braking mechanism 582, and the steering mechanism 584 based on the information of the position and the posture of the moving object 500.

Thus, for example, it is possible to realize automatic driving control of the moving object 500 by the automatic driving control unit 574. In the automatic driving control, a monitoring result of a surrounding object by the monitoring device 578, map information or a running route stored in the storage unit 576, and the like are used in addition to the information of the position and the posture of the moving object 500. The control device 570 switches the execution or non-execution of the automatic driving of the moving object 500 based on a monitoring result of the output signal of the inertial measurement unit 10. For example, the posture estimation device 20 monitors the output signal such as detection data from the inertial measurement unit 10. When a decrease of detection accuracy of the inertial measurement unit 10 or a sensing problem is detected based on the monitoring result, for example, the control device 570 performs switching from the execution of the automatic driving to the non-execution of the automatic driving. For example, in the automatic driving, at least one of accelerating, braking, and steering of the moving object 500 is automatically controlled. When the automatic driving is not executed, such automatic control of accelerating, braking, and steering is not performed. In this manner, an assistance having higher reliability in running of the moving object 500 that performs automatic driving is possible. An automation level of the automatic driving may be switched based on the monitoring result of the output signal of the inertial measurement unit 10.

7. Seventh Embodiment

Next, a moving object 600 including sensor modules 1, 1a, 1b according to a seventh embodiment will be described with reference to FIGS. 12 and 13. In the following description, a configuration to which the sensor module 1 is applied will be illustrated and described.

The posture estimation device 20 in the sensor module 1 in the embodiment can be effectively used in posture control and the like of a construction machine. A hydraulic shovel being an example of the construction machine as the moving object 600 will be described.

Figure 12:
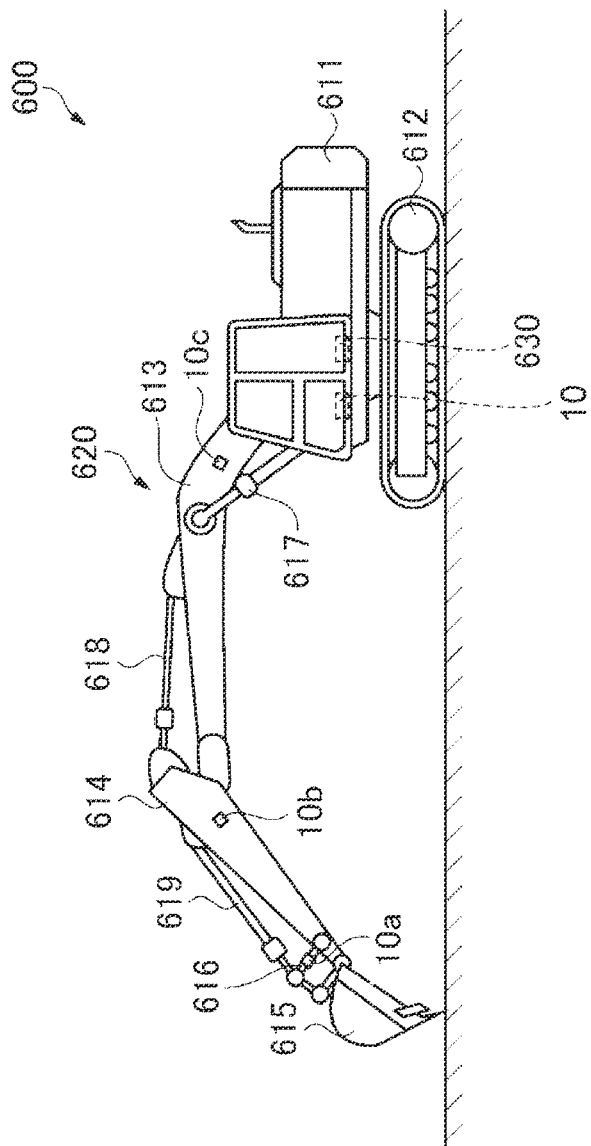
FIG. 12 is a diagram illustrating a configuration of a moving object including a sensor module according to a seventh embodiment.

As illustrated in FIG. 12, in the moving object 600, a vehicle body includes a lower running body 612 and an upper revolving body 611 mounted on the lower running body 612 to be revolvable, and a work mechanism 620 configured by a plurality of rotatable members in an up-down direction is provided in the front of the upper revolving body 611. A driver seat (not illustrated) is provided on the upper revolving body 611. The driver seat is provided with an operation device (not illustrated) that operates members constituting the work mechanism 620. An inertial measurement unit 10 in the embodiment, that functions as an inclination sensor that detects an inclination angle of the upper revolving body 611 is disposed in the upper revolving body 611.

The work mechanism 620 includes a boom 613, an arm 614, a bucket link 616, a bucket 615, a boom cylinder 617, an arm cylinder 618, and a bucket cylinder 619, as the plurality of members. The boom 613 is attached to the front portion of the upper revolving body 611 to be capable of elevating. The arm 614 is attached to the tip of the boom 613 to be capable of elevating. The bucket link 616 is attached to the tip of the arm 614 to be rotatable. The bucket 615 is attached to the tip of the arm 614 and the bucket link 616 to be rotatable. The boom cylinder 617 drives the boom 613. The arm cylinder 618 drives the arm 614. The bucket cylinder 619 drives the bucket 615 through the bucket link 616.

The base end of the boom 613 is supported by the upper revolving body 611 to be rotatable in the up-and-down direction. The boom 613 is rotationally driven relative to the upper revolving body 611 by expansion and contraction of the boom cylinder 617. An inertial measurement unit 10c functioning as an inertial sensor that detects the movement state of the boom 613 is disposed in the boom 613.

One end of the arm 614 is supported by the tip of the boom 613 to be rotatable. The arm 614 is rotationally driven relative to the boom 613 by expansion and contraction of the arm cylinder 618. An inertial measurement unit 10b functioning as an inertial sensor that detects the movement state of the arm 614 is disposed in the arm 614.

The bucket link 616 and the bucket 615 are supported by the tip of the arm 614 to be rotatable. The bucket link 616 is rotationally driven relative to the arm 614 by expansion and contraction of the bucket cylinder 619. The bucket 615 is rotationally driven relative to the arm 614 with the bucket link 616 driven. An inertial measurement unit 10a functioning as an inertial sensor that detects the movement state of the bucket link 616 is disposed in the bucket link 616.

The inertial measurement units 10a, 10b, and 10c can detect at least any of an angular velocity and an acceleration acting on the members of the work mechanism 620 or the upper revolving body 611. As illustrated in FIG. 13, the inertial measurement units 10a, 10b, and 10c are coupled in series and can transmit a detection signal to a calculation device 630. As described above, since the inertial measurement units 10a, 10b, and 10c are coupled in series, it is possible to reduce the number of wires for transmitting a detection signal in a movable region and to obtain a compact wiring structure. With the compact wiring structure, it is easy to select a method of laying the wire, and it is possible to reduce an occurrence of deteriorating or damaging the wire, for example.

Figure 13:
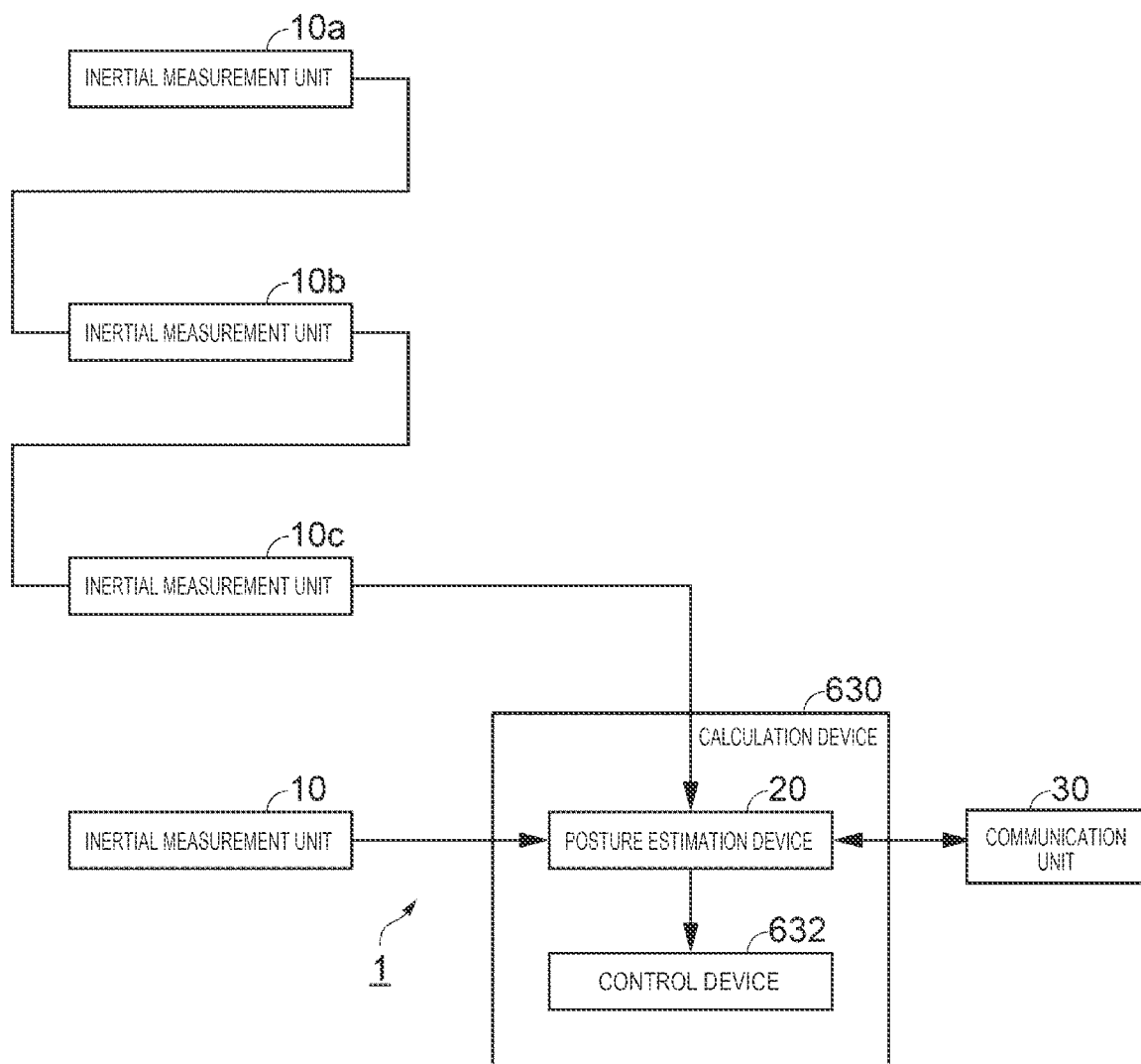
FIG. 13 is a block diagram illustrating the configuration of the moving object.

Further, as illustrated in FIG. 13, the calculation device 630 is provided in the moving object 600. The calculation device 630 calculates an inclination angle of the upper revolving body 611 or the positions or postures of the boom 613, the arm 614, and the bucket 615 constituting the work mechanism 620. As illustrated in FIG. 13, the calculation device 630 includes the posture estimation device 20 in the above embodiment and a control device 632. The posture estimation device 20 estimates posture information of the moving object 600 based on an output signal of the inertial measurement units 10, 10a, 10b, and 10c. The control device 632 controls the posture of the moving object 600 based on the posture information of the moving object 600, which has been estimated by the posture estimation device 20. Specifically, the calculation device 630 receives various detection signals input from the inertial measurement units 10, 10a, 10b, and 10c and calculates the positions and postures or posture angles of the boom 613, the arm 614, and the bucket 615 or an inclination state of the upper revolving body 611 based on the various detection signals. The calculated position-and-posture signal including a posture angle of the boom 613, the arm 614, or the bucket 615 or an inclination signal including a posture angle of the upper revolving body 611, for example, the position-and-posture signal of the bucket 615 is used in feedback information for a display of a monitoring device (not illustrated) on the driver seat or for controlling an operation of the work mechanism 620 or the upper revolving body 611, and is further transmitted to another device and the like via the communication unit 30.

As the construction machine in which the posture estimation device 20 of the sensor module 1 in the above embodiment is used, for example, a rough terrain crane (crane car), a bulldozer, an excavator/loader, a wheel loader, and an aerial work vehicle (lift car) is provided in addition to the hydraulic shovel (jumbo, back hoe, and power shovel) exemplified above.

According to the embodiment, with the posture estimation device 20 of the sensor module 1, it is possible to obtain information of a posture with high accuracy. Thus, it is possible to realize appropriate posture control of the moving object 600. According to the moving object 600, since the compact inertial measurement unit 10 is mounted, it is possible to provide a construction machine in which a plurality of inertial measurement units can be compactly disposed at installation sites of the inertial measurement units 10 by serial coupling (multi-coupling), or cable routing of coupling the inertial measurement units 10 installed at the sites to each other in series by a cable can be compactly performed, even in a very narrow region such as the bucket link 616.

In the embodiment, descriptions are made by using the four-wheel vehicle such as the agricultural machine and the construction machine as an example of the moving object in which the posture estimation device 20 is used. However, in addition, motorcycles, bicycles, trains, airplanes, biped robots, remote-controlled or autonomous aircraft (such as radio-controlled aircraft, radio-controlled helicopters and drones), rockets, satellites, ships, automated guided vehicles (AGVs) are provided.

As an example in which the posture estimation device 20 of the sensor module 1 is used, in addition to the moving object, a wearable device such as a smartphone, a tablet terminal, a smart watch, a smart glass, an HMD (head mounted display), and an electronic device such as a camera and a video camera including a stabilizer and the like are exemplified.

What is claimed is:

1. A movable vehicle comprising:
    a sensor module, the sensor module including:
        a posture estimation device, the posture estimation device including:
            a communication interface configured to receive a pulse signal, the pulse signal corresponding to movement information of the movable vehicle;
            a memory configured to store a program, acceleration information based on a posture change of the movable vehicle, angular velocity information based on the posture change of the movable vehicle, and a plurality of posture parameters related to a movement of the movable vehicle; and
            a processor configured to execute the program so as to:
                receive the pulse signal, the acceleration information, and the angular velocity information;
                calculate an assumed velocity V from the pulse signal;
                select a first parameter of the plurality of posture parameters from the memory when V<x, x being a first predetermined value;
                select a second parameter of the plurality of posture parameters from the memory when x≤V≤y, y being a second predetermined value;
                select a third parameter of the plurality of posture parameters from the memory when y<V; and
                estimate a posture of the movable vehicle based on the acceleration information, the angular velocity information, and one of the first, second, and third parameters; and
        an inertial measurement module, the inertial measurement module including:
            an acceleration sensor configured to detect an acceleration included in the acceleration information;
            an angular velocity sensor configured to detect an angular velocity included in the angular velocity information; and
            a signal processing circuit configured to process signals output from the acceleration sensor and the angular velocity sensor; and
    a vehicle controller configured to execute an automatic driving of the movable vehicle and control the posture of the movable vehicle based on the posture of the movable vehicle that is estimated by the sensor module.

2. The movable vehicle according to claim 1, wherein the pulse signal is a vehicle velocity pulse signal obtained by measuring a velocity of the movable vehicle.

3. The movable vehicle according to claim 1, wherein the pulse signal is a pulse-per-second signal output from a GPS attached to the movable vehicle.

4. The movable vehicle according to claim 1, wherein the communication interface is configured to output posture information of the posture of the movable vehicle estimated by the sensor module.

5. A measurement system comprising:
the movable vehicle according to claim 1; and
a host device that is electrically coupled to the sensor module.

* * * * *